Jan. 24, 1967 O. C. HALL 3,300,592

TELEPHONE TEST CIRCUIT

Filed Jan. 21, 1963

INVENTOR

Oliver C. Hall,

BY Watson, Cole, Grindle & Watson

ATTORNEYS

United States Patent Office 3,300,592

Patented Jan. 24, 1967

3,300,592

TELEPHONE TEST CIRCUIT

Oliver C. Hall, Charlottesville, Va., assignor to Stromberg-Carlson Corporation, a corporation of Delaware Filed Jan. 21, 1963, Ser. No. 252,729
2 Claims. (Cl. 179—175.2)

Figures 1, 2:
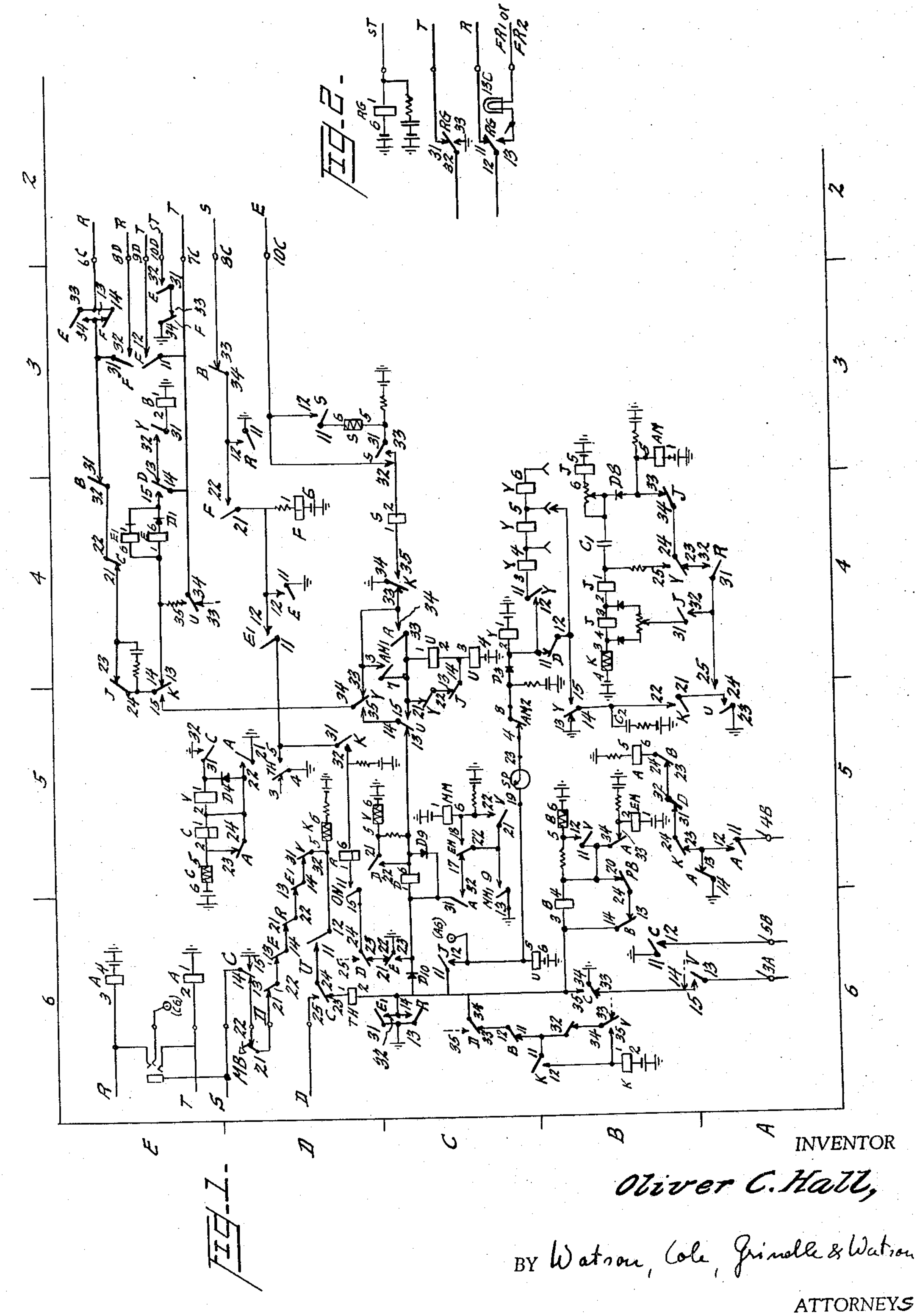

This invention relates to a telephone communications testing circuit and more particularly, to a testing circuit for testing the central office equipment and the subscriber telephone. This circuit provides for the testing of the central office equipment and the subscriber telephone by the installer at the time that the subscriber's station is installed.

Priorly, testing of the newly installed telephone required the assistance of a test man located at the central office and operating suitable circuits from a test desk. If a large number of telephones were being installed during the same period and each of the installers was trying to obtain the assistance of the test desk man, then considerable time was wasted by the other installers waiting for an opportunity to have their newly installed phones tested from the central office.

Accordingly, it is an object of this invention to provide an improved testing circuit for testing both the central office equipment and the subscriber's telephone without the assistance of a test desk man or a test man at the central office.

It is another object of this invention to provide an improved testing circuit for telephone equipment which can be operated from the subscriber's station.

It is a still further object of this invention to provide an improved telephone testing circuit which can be operated from the subscriber's station to store in the central office the telephone number dialed from the subscriber's station and to read out this stored number into the central office equipment and thereby dial the subscriber's station.

Briefly, in accordance with aspects of this invention, the test circuit is installed in the central office and access to this test circuit is obtained through a subscriber's station by the installer, preferably at the time the subscriber station is installed. It is, of course, understood that this circuit may be employed at any time for testing the dialing operation of the subscriber's station as well as the quality of transmission and the central office equipment.

The installer seizes this test circuit by lifting the handset and dialing an access code in the service code train such as 11X. When this circuit is reached, the installer receives the distinctive tone and then dials the telephone number of the telephone just installed. These digits are recorded or stored on the impulse repeater of this circuit. After dialing this number, he hangs up and the test circuit then seizes a first selector and transmits the digits recorded or stored through the local train just as though a subscriber were dialing the number. If the central office connections are correct, the bell of the telephone just installed will start ringing. The installer will answer the telephone and this will cause ringing current to be sent forward to an electronic secretary, which circuit will transmit a message to the installer enabling him to judge the quality of transmission. He will then dictate into the telephone the number of the telephone which has been installed and tested satisfactory and disconnect whereupon the test circuit will release. The purpose of recording on the electronic secretary is to make a permanent record so that a clerk can listen to this record periodically and see that the information for the newly installed telephone is posted on the information records.

These and various other objects and features of the invention will be more clearly understood from a reading of the detailed description of the invention in conjunction with the drawing in which:

FIG. 1 is a combined schematic and pictorial representation of the portion of one illustrative embodiment of this invention; and, FIG. 2 is a combined schematic and pictorial representation of another portion of this illustrative embodiment of the invention.

Referring now to FIG. 1, there is depicted a major portion of the call back circuit according to one illustrative embodiment in which the call back circuit is preferably installed in the telephone central office. In the description of this invention reference will be made to the various relays and relay contacts in terms of their location on the drawing by giving these elements grid designations in terms of letters and numbers, which letters designate the ordinates, while the numbers designate the abscissae for the area in which these elements are located. For simplicity, the relay windings are given a letter designation and the contacts operatively associated with these windings are given a letter designation corresponding to the associated winding plus a number designation to distinguish these contacts from the other contacts of the same relay.

The following table of relay functions is presented for the purpose of facilitating the understanding of this invention in terms of the winding designation and the function or functions performed when this winding is energized:

A—Seizure and incoming pulsing.
B—All trunks busy.
C—Hold while dialing in. Start out dialing on release.
D—Recognize connector seizure at end of outpulsing.
E1—(With R and E) hold after installer disconnects.
E—Recognize answer by installer and (with F and RG) ring electronic secretary.
F—Connect electronic secretary.
J—Generate pulses.
K—(With D) connects E and E1 for supervision.
R—(With U) starts out pulsing.
S—Signals selector that no further digits should be absorbed.
U—(See R).
V—(With C) provides peg count (with magnet MM), marks end of digit.
Y—Stop pulsing at end of each digit.

This testing circuit includes several relays and an impulse repeater for receiving, storing and transmitting corrected digits to all the following circuits of the train. The impulse repeater or dial pulse storage device may be of a container type. In this particular instance, the description will be made of a system employing the electromechanical impulse repeater made by Siemens-Halske under the designation 9Fg schw3b, which repeater is well known to those skilled in the field of telephone communications. This repeater is also marketed by the U.S. Instrument Corporation of Charlottesville, Virginia, under the designation "U.S.I. A850 Impulse Repeater." This impulse repeater consists essentially of three magnets, a disc with 72 separate radial metallic leaves, which can be depressed through a slot, an arm which makes contact with the leaves, and moves with the disc as pulses (which operate the first magnet) are received. As the disc is rotated by this magnet, the second magnet is operated for the duration of the digit, and causes all leaves except the first to be held behind the insulating ring. As pulses are transmitted, the arm rotates in an opposite direction to the disc, under control of the third magnet, and out of contact with the depressed leaves. When the rotating arm makes contact with a leaf not depressed, pulsing of a digit is stopped until the next switch in the train is ready for pulses. A total of 64 pulses can be stored.

In the upper left-hand corner of FIG. 1, leads R, T and S indicate leads to which access is obtained directly from the selector multiple or through the dial speed test circuit, not shown. The designations mean "ring," "tip" or "sleeve" of the selector multiple or dial speed test circuit.

On seizure, battery (D5), on the sleeve permits the preceding switch to seize this circuit, operating relay A (E6) and in turn relay C (D5). Relay C locks to its 31–32 contact (E5). Relay A short circuits relay V, preventing operation of relay V. Relay contacts C34–35 (B6) provide holding ground and cause a small current in relay D (D5) so that relay D will operate quickly when relay D receives a pulse of current at a later time. Relay contacts C14–15 ground the incoming sleeve to hold preceding switches.

As the installer dials the number of the telephone installed, relay A follows the pulses. Contacts A21–22 (D5) remove a short circuit from relay V, which operates, and contacts A23–24 short circuit relay C making it slow to release. Contacts V34–35 (B6) operate relay K. Relays C and V hold operated to the end of the digit, when relay C holds and relay V releases slowly. Contact A33–34 (B5) operates magnet EM of the impulse repeater each time relay A releases. This advances the storage disc SP (C5) one leaf per pulse. Contact ON (D5) is closed as soon as the storage disc advances and remains closed until all stored digits are read out. Contact ON operates relay R. When contacts A31–32 (C6) operate on the second impulse of each digit, magnet MM operates because at this time relay V is operated and magnet EM is released. Magnet MM locks to relay V and causes the remaining leaves advanced on the digit to be depressed behind an insulating ring and thus, are not able to contact the arm SP (C5) of the impulse repeater as it rotates on outpulsing or reading out. The above sequence is repeated for each digit.

After the installer dials the number of the installed telephone, the installer hangs up. This releases relay A which operates relay V in the same manner as on dialing, but as relay C remains short circuited it releases slowly, in turn releasing relay V. Contacts C34–35 (B6) connect ground to lead PC during the release time of relay V to operate a peg count meter, not shown, if desired.

When contacts C21–22 (E4) are released, battery (C4) is connected through relay U to the ring of the first selector. This causes the associated control circuit to prepare to receive pulses, which is indicated by the return of low resistance ground. As relays K and R are operated at this time, this ground operates relay U.

Contacts U23–25 (A5) connect ground to magnet AM, winding 5–6 of relay J, and through condenser C1, to relay windings J1–2 and 3–4. Relay J tends to operate on its 5–6 winding, but as wind 1–4 opposes 5–6, its operation is delayed until C1 is charged, reducing the current through winding J1–4. Contacts J33–34 then open the circuit to J5–6 and magnet AM which, in releasing, returns the impulse repeater contact arm one step. Contacts J31–32 connect ground through rectifiers to windings J1–2 and 3–4. Relay J remains operated until condenser C1 becomes discharged and partially charged in the reverse direction. When relay J releases, its contacts 34–33 close ground to windings J5–6 and AM, repeating the above sequence until the arm of the impulse repeater makes contact with a leaf not depressed, which indicates the end of the digit. This is indicated in FIG. 1 of the drawing by SP at (C5). This operates relay Y on ground through contacts J11–12 (C6) (which also holds relay U operated). Contacts Y23–24 (B4) prevent further operation of relay J. Each time contacts J23–24 (E4) operate, the circuit over the ring to the control circuit is opened, pulsing the control circuit relay. At the end of the digit, the control circuit removes ground from the ring, releasing relay U, and in turn relay Y, but relay Y releases slowly as it is held on its 1–2 winding by the discharge current of condenser C2 (B5). During the release time of relay Y, relay D (C6) is connected to the ring to test for completion of dialing, as will be subsequently described. Relay B (E3) is also connected to the tip to receive an all trunks busy indication as will be subsequently described. If the digit is not to be absorbed, or is to be absorbed once only, the control circuit returns ground over lead E, operating relay S which locks to relay K, and immediately returns battery over lead E. If the digit was absorbed, this battery indicates to the control circuit when seized for the following digit, that that digit should not be absorbed.

If any selector in the train finds all trunks busy, battery is returned over the tip, operating relay B. Contacts B34–33 open the sleeve releasing the selector held by ground from contacts E11–12 (D4). Contacts B11–12 (C–6) when operated, release relay K and contacts K33–34 (C4) in turn operate relay U. Relay U starts relays J and AM pulsing to return the impulse repeater to its normal position, which opens the circuit of relay ON (D6) releasing relay R, thus restoring the circuit to normal.

After all digits are read out or pulsed out, the connector should have seized the terminals of the called telephone, and returned battery and ground over the ring and tip, respectively. The battery on the ring, during the release time of contacts Y33–34 (D5) will operate relay D which locks to its 21–22 contacts on ground from R, and after the release of R on ground from relays E1 and E. Contacts D33–34 (C6) release relay K. Contacts K13–14 and D14–15 connect E and E1 across the loop. E1 operates through diode R2. R is slow to release and holds after contact ON opens until E1 operates. The connector, if all cross connections are correct and the called line is not busy, should ring the subscriber's phone. The installer should answer at once (to prevent time out described below). This causes the connector to reverse battery and ground, releasing relay E1 and operating relay E. Relay E operates relay RG in FIGURE 2 and relay F which locks to the sleeve. Relay F connects the electronic secretary and opens the circuit to relay RG, but relay RG remains operated a short time on the discharge current of condenser C3, to give a short ring to the electronic secretary. That device gives a recorded announcement to provide a check for transmission quality. The installer should then dictate the satisfactory completion of installation which will be recorded on the secretary. He should then hang up. This causes re-reversal of battery and ground, releasing relay E and operating relay E1. Relay F operated and relay E released open the loop releasing relay E1 and causing the connector to remove ground from the sleeve. This releases relay R, restoring the circuit to normal.

If for any reason, such as an open loop, reaching a wrong number, faulty cross connections or the connector terminal being busy, contacts C23–24 (D6) released and relay E1 operated close the circuit to thermal relay TH. This requires about 12 to 24 seconds to close its contact (D5). When operated, relay TH operates relay F to open the loop, thus causing release as described above. Relay TH also short circuits relay R through contacts K31–32 operated. This releases relay R which removes ground from relay TH and causes its release. Contacts R13–14 also release relay K. This allows relay R to reoperate. Contacts R33–34 (C4) then operate relay U to cause the impulse repeater to restore to normal as described above.

To make the circuit busy, key MB (D6) is operated removing battery from the sleeve thereby preventing the selectors from seizing this circuit. During the progress of the call, any of relays C, D, E, E1, R, or V will also remove battery from the sleeve to keep this circuit busy.

While I have shown and described one illustrative embodiment of this invention, it is understood that the concepts thereof can be applied to other embodiments without departing from the spirit and scope of this invention.

What is claimed is:

1. In a telephone system for testing a subscriber's telephone, the subscriber loop and the central office selectors, the combination comprising means for storing the pulse train corresponding to numbers dialed by said subscriber's telephone, means for reading out said pulse train into said selectors after said telephone is disconnected from said loop, whereby said selectors respond to said pulse train and cause ringing current to be transmitted to the telephone corresponding to the number dialed and an electronic secretary for recording a message dictated from said subscriber's telephone.

2. In a telephone system, means for testing a subscriber's telephone, the subscriber's loop, and the central office selector, said means comprising: relay means for seizing the subscriber's line, relay means for holding the subscriber's line, relay means for changing over normal operation where one subscriber calls another subscriber in said telephone while the line is held by said relay means system to loop control so that a subscriber can call his own line, means for generating pulses in response to pulses dialed in from the subscriber's telephone, relay means for storing the pulses generated in response to dialing said subscriber's telephone and releasing them to seize the subscriber's line after the line is disconnected, an electronic secretary, and means connecting said electronic secretary to the subscriber's line when said line is seized under said loop control to receive a message from the subscriber's telephone thereby indicating the transmission quality of the loop.

References Cited by the Examiner

UNITED STATES PATENTS 3,033,931 5/1962 Smith ------------ 179—19.5

KATHLEEN H. CLAFFY, *Primary Examiner.*

F. N. CARTEN, *Assistant Examiner.*

UNITED STATES PATENT OFFICE
CERTIFICATE OF CORRECTION

Patent No. 3,300,592 January 24, 1967

Oliver C. Hall

It is hereby certified that error appears in the above numbered patent requiring correction and that the said Letters Patent should read as corrected below.

Column 1, lines 60 and 66, column 2, lines 36 and 37, column 4, lines 44, 47 and 51, column 5, line 18, and column 6, lines 11 and 12, for "secretary", each occurrence, read -- recorder --

Signed and sealed this 28th day of November 1967.

(SEAL)
Attest:

Edward M. Fletcher, Jr.
Attesting Officer

EDWARD J. BRENNER
Commissioner of Patents